R. BURNS.
COFFEE GRANULATING MILL.
APPLICATION FILED JULY 14, 1913.

1,089,818.

Patented Mar. 10, 1914.
3 SHEETS—SHEET 2.

Witnesses:
William Miller
Chris. H. Almstead

Inventor
Robert Burns
By his Attorneys
Hauff & Harland

R. BURNS.
COFFEE GRANULATING MILL.
APPLICATION FILED JULY 14, 1913.
1,089,818.
Patented Mar. 10, 1914.
3 SHEETS—SHEET 3.
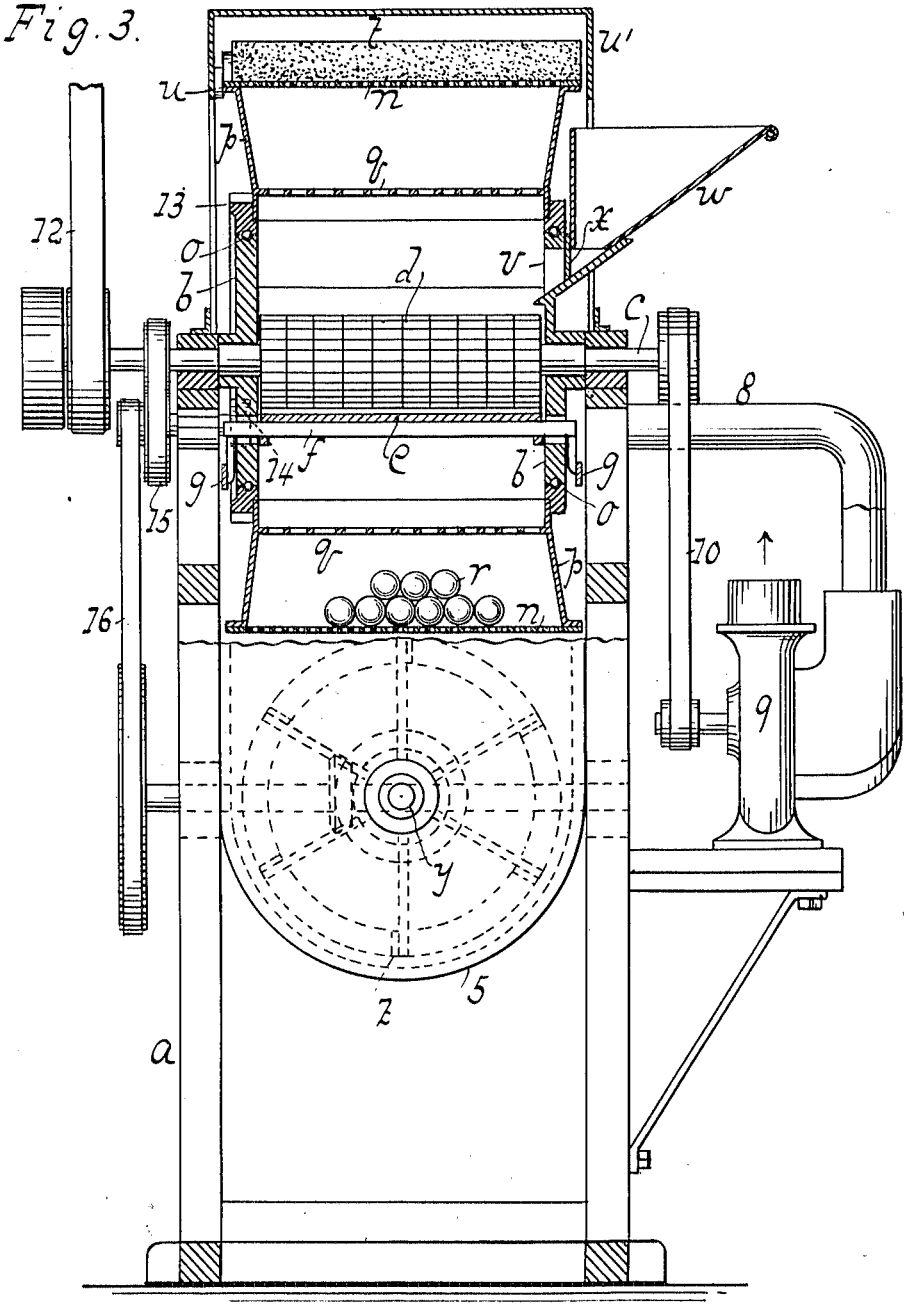
Witnesses:
William Miller
Chris. H. Olmstead
Inventor
Robert Burns
By his Attorneys
Hauff & Harland

UNITED STATES PATENT OFFICE.

ROBERT BURNS, OF NEW YORK, N. Y., ASSIGNOR TO JABEZ BURNS & SONS, OF NEW YORK, N. Y., A CORPORATION OF NEW YORK.

COFFEE-GRANULATING MILL.

1,089,818. Specification of Letters Patent. Patented Mar. 10, 1914.

Application filed July 14, 1913. Serial No. 778,914.

*To all whom it may concern:*

Be it known that I, ROBERT BURNS, a citizen of the United States, residing at New York, county of New York, State of New York, have invented new and useful Improvements in Coffee-Granulating Mills, of which the following is a specification.

This invention relates to a mill for granulating and cleaning coffee, in which the coffee is ground by means of serrated cylindrical cutters, in connection with a concave serrated bed. The cutters are straight edged so as to break the coffee bean in the required number of pieces which drop into a revolving perforated drum. The perforations in the drum serve to allow the particles of coffee which have been ground to the required dimensions to pass through, while the larger pieces will be carried back to the cutters. By reason of the peculiar formation of the cutters the teeth thereof will break the bean into uniform pieces. The perforated drum revolves concentrically on a pair of stationary disks fixed to the frame of the mill. These disks carry ball bearings to give easy rotation and support to the drum. Suction devices communicate through one side of a disk with the interior of the drum and these devices acting in conjunction with deflectors will effectively remove the chaff after the cutters break the bean. The different particles of coffee are thoroughly mixed after falling through the perforations in the drum by the employment of a series of revolving agitator blades.

Figure 1:
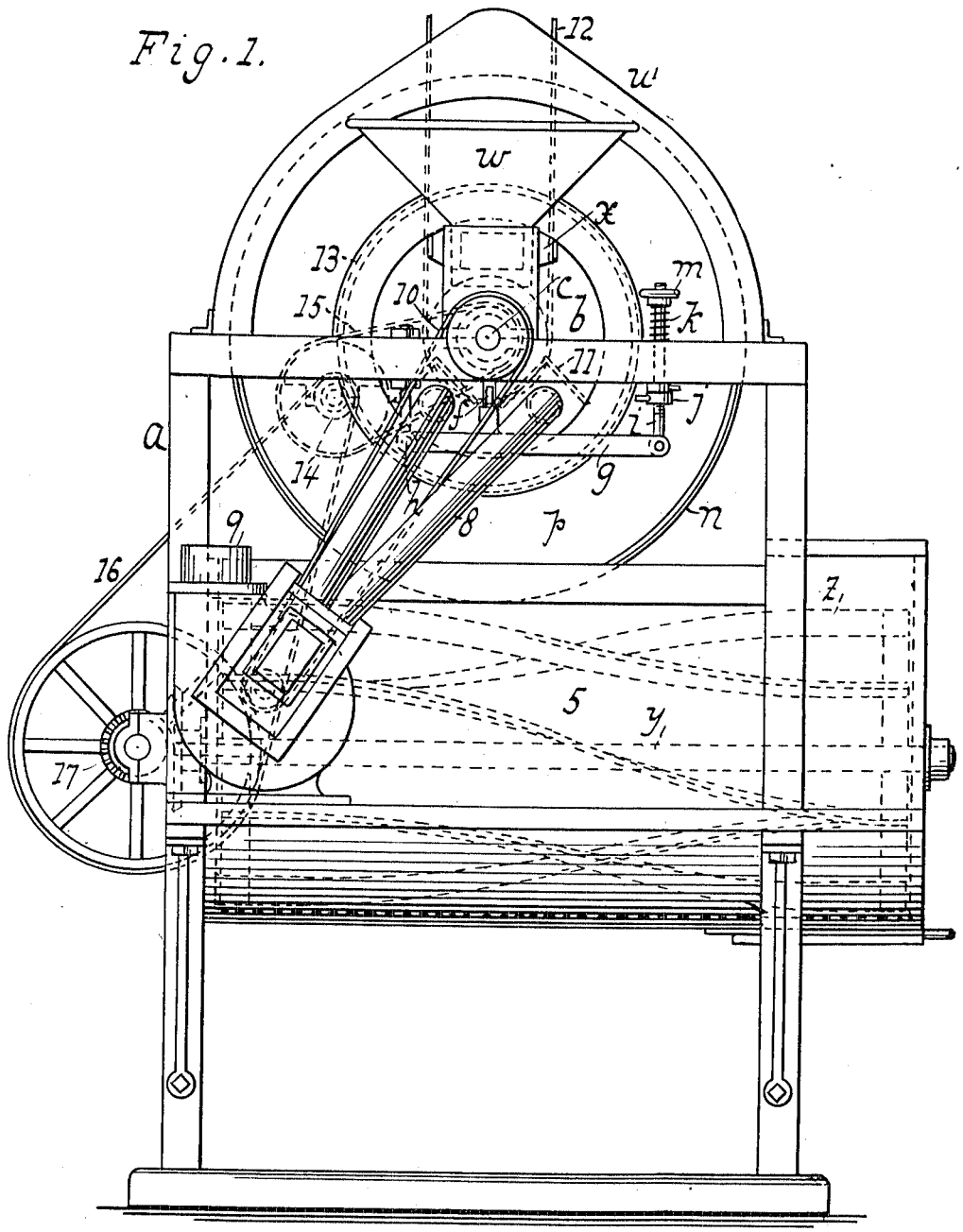
Figure 2:
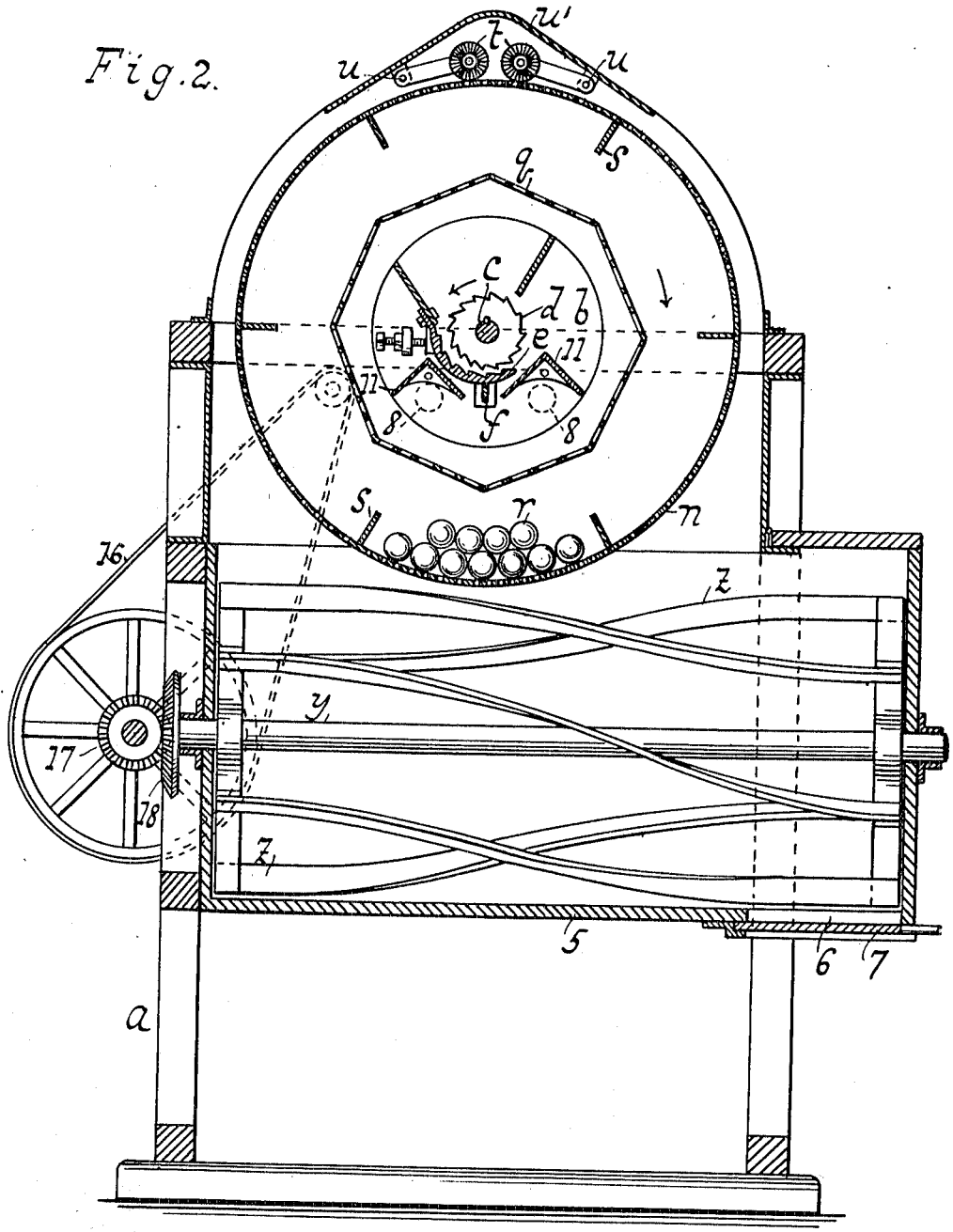

The novel features of the invention are more fully described in the following specification and claims and illustrated in the accompanying drawings in which:

Figure 1 represents a side elevation of a mill embodying this invention. Fig. 2 is a vertical section of the same. Fig. 3 is a front elevation of the same partly in section.

In these drawings the letter $a$ designates a frame of suitable construction to support the operating devices for the mill. A pair of disks $b$ are secured to or mounted on the frame and a spindle $c$ is journaled in the frame. This spindle has fixed to it a series of serrated cylindrical cutters $d$ of steel and constituting the runner of the mill. A serrated steel concaved bed $e$ is positioned between the disks. This bed is supported on a cross-bar $f$ extending through slots in the sides of the disks and supported on levers $g$ arranged along the outer sides of the disks. Each lever is fulcrumed at one end $h$ to the frame and the other end has a rod $i$ with nuts $j$ for adjusting the lever in its relation to the concave bed. The rod has a spring $k$ the tension of which can be adjusted by a hand wheel $m$ threaded on the rod. The concave bed is adjusted by means of the said lock nuts $j$ and the spring provides yielding means to prevent breakage of the teeth of the cutters when a hard metallic substance passes between the same. A drum having a perforated periphery $n$ is mounted on ball bearings $o$ running in grooves formed in the disks. The drum has flaring sides $p$ best seen in Fig. 3 to give increased capacity to the drum. Spacing the interior of the drum is a polygonal diaphragm or sieve $q$ having larger perforations than the drum so as to allow the broken material to pass through. In this space is confined a series of balls $r$ so that when the drum is rotated the balls will whirl around and thus disintegrate the material. It will be seen that the sieve $q$ prevents the balls from getting into contact with the cutters. The drum is provided with projecting lifts $s$ extending across the drum of suitable construction for carrying back to the cutters all pieces too large to go through the perforations in the periphery of the drum.

A pair of brushes $t$ are pivoted at $u$ to a hood $u'$ secured to the frame. These brushes rotate by frictional contact with the circumference of the drum and prevent any dust from settling on to the drum. One of the disks is provided with an opening $v$ and a hopper $w$ is positioned on to the opening for receiving the beans. A gate $x$ regulates the flow of beans from the hopper through the said opening to the cutters. A shaft $y$ is located below the drum and it carries a series of agitator blades $z$ preferably spiral in form. The blades are housed in a box 5 and are adapted to thoroughly mix the granulated coffee dropped through the perforations in the drum. The box has an opening 6 located at the lower end thereof and this opening is normally closed by a gate 7. The contents of the box can be withdrawn when the gate is slid outward to uncover the opening into a bag or other receptacle. Exhaust pipes 8 are connected to the side of one of the disks and communicate with the interior of the drum. These exhaust pipes are connected to an exhauster 9 mounted on the frame of the mill. The exhauster is operated by a belt and pulley connection 10 to the driving spindle *c* of the runner cutters.

Located in the drum and secured to the disks are a pair of stationary deflectors 11 extending across the drum. The deflectors are Λ shaped and preferably situated above the exhaust so that any of the lighter particles such as the chaff of the coffee will be drawn into the exhaust when gravitating to the bottom of the drum. By having the deflectors located as shown, the exhaust is prevented from acting on the material before it is cut; and it is regulated to draw only the lighter foreign substances such as dirt and chaff from the ground coffee. The cutter runner is rotated by means of a belt and pulley connection 12 mounted on the spindle. The drum is rotated by a gear 13 fixed to the drum. This latter gear is actuated by a pinion 14 with belt and pulley connection 15 to the said spindle. By having the gear 13 secured directly to the drum and driven in the way shown it gives uniform motion and keeps the drum concentric or in line with the disks. The agitator blades are revolved by means of a belt and pulley 16 connected to the shaft of the pinion 14 thus imparting motion to a bevel gear 17 in engagement with a bevel gear 18 on the shaft *y* of the agitator blades.

While I have shown and described a concave bed combined with a runner cutter, I do not limit myself to any particular form of crushing devices.

By having the drum mounted on antifriction balls as shown a dust proof joint is provided between the drum and the disks and lodgment of dirt or grit in the ball bearings is avoided.

I claim:

1. In a coffee granulator the combination with a pair of stationary disks, of a drum with perforated periphery mounted on the disks, grinding devices disposed between the disks, means for rotating the drum, a concentric diaphragm provided with larger perforations than those in the drum to permit the material to pass through, fixed in the drum, balls confined in the space between the perforated periphery of the drum and the diaphragm and means connected with the perforated drum constructed to carry the balls upward with the drum by the rotation of the drum.

2. In a coffee granulator and cleaner the combination with a pair of stationary disks, of a perforated drum mounted on the disks, grinding devices disposed between the disks, means for rotating the drum, stationary deflectors coöperating with the grinding devices located in the drum, and suction pipes communicating with the deflectors.

3. In a coffee granulator and cleaner the combination with a pair of stationary disks, of a perforated drum mounted on the disks, grinding devices disposed between the disks, means for rotating the drum, deflectors coöperating with the grinding devices secured to the disks, and suction pipes communicating with the deflectors.

4. In a coffee granulator and cleaner the combination with a pair of stationary disks, of a perforated drum mounted on the disks, grinding devices disposed between the disks, means for rotating the drum, inverted V shaped deflectors coöperating with the grinding devices secured to the disks, and suction pipes with inlets located below the deflectors.

In testimony whereof I have hereunto set my hand in the presence of two subscribing witnesses.

ROBERT BURNS.

Witnesses:
   WM. E. WARLAND,
   CHRIS H. ALMSTEAD.